United States Patent [19]

Tolbird

[11] 3,870,877

[45] Mar. 11, 1975

[54] STATIC SWITCHING CONTROL

[76] Inventor: Paul D. Tolbird, P.O. Box 7103, Monroe, La. 71201

[22] Filed: Oct. 2, 1973

[21] Appl. No.: 404,813

[52] U.S. Cl. ................. 250/209, 250/214, 250/239, 315/155, 317/127

[51] Int. Cl. .. H05b 37/02, H01h 47/24, H01j 39/12

[58] Field of Search ............ 315/155, 159; 250/209, 250/239, 225, 214; 317/127; 307/311

[56] References Cited

UNITED STATES PATENTS

| | | | |
|---|---|---|---|
| 2,140,368 | 12/1938 | Lyle | 250/225 |
| 2,351,707 | 6/1944 | Rouprich | 317/127 |
| 3,421,013 | 1/1969 | Angelari | 315/159 |
| 3,538,379 | 11/1970 | Berlin | 315/159 |
| 3,599,048 | 8/1971 | Olin | 250/239 |
| 3,767,924 | 10/1973 | Charles et al. | 250/209 |
| 3,790,848 | 2/1974 | Lai | 315/155 |

*Primary Examiner*—James W. Lawrence
*Assistant Examiner*—T. N. Grisby
*Attorney, Agent, or Firm*—Clarence A. O'Brien; Harvey B. Jacobson

[57] ABSTRACT

An electrically controlled device is switched on and off by light actuated switch modules plugged into electrically interconnected tube sockets to which a source of current is connected. A circuit holding module is removably stacked on one of the switch modules to maintain the controlled device energized until reset by actuation of the other switch module.

14 Claims, 4 Drawing Figures

STATIC SWITCHING CONTROL

This invention relates generally to light responsive swtiching control systems and in particular to a modular assembly of components forming such a control system.

An important object of the present invention is to provide a light responsive control assembly having greater flexibility as to installation and use as comared to prior light responsive control systems and one which can be readily serviced so as to maintain in an operating condition. Light responsive control systems heretofore available, involved moving parts such as shutters and required special installational fastenings. Further, prior light responsive control systems were restricted to specific operational modes making them unsuitable for many different types of installations.

In acordance with the present invention, a light responsive control system is provided made up of removably stacked modules embodying solid state circuitry. A pair of tube sockets electrically interconnected to a commercial source of electrical energy such as a 120 volt source of alternating current, is adapted to receive a pair of light responsive switch modules designed to respectively switch on and switch off an electrically controlled device connected to one of the tube sockets. Both of the switch modules accordingly include photo-sensing devices upon which light is adapted to impinge. In one of the switch modules, the photo-sensing device controls the charging of a storage capacitor by means of which a static, electronic switch such a quadrac is switched on and off in order to control energization of an electrically controlled device such as a lamp. The photo-sensing device in the other switch module, is supplied with a constant source of voltage in order to control the state of an electronic switch such as a transistor for reset purposes. The latter switch module will accordingly effect reset of a circuit holding module by means of which the electrically controlled device is maintained energized once activated. The circuit holding module which may be removably stacked onto one of the switch modules, aforementioned, includes a neon lamp that generates illumination for maintaining one of the light responsive switch modules closed. The neon lamp is maintained energized through a latching type of electronic switch such as a light activated silicon controlled rectifier. The neon lamp is extenguished by a reset signal that switches off a transistor connected in series with the SCR and the lamp. The reset signal may be generated either manually or by one of the switch modules aforementioned.

The light responsive control system of the present invention because of its constructional and operational attributes, will make it suitable for diverse purposes. For example, the control system may be utilized to control waxing spray valves in an automatic car wash under control of the automobile headlights, for operating large lights under control of the automobile headlights, for operating dock lights from a boat by use of a flashlight, as well as to enable police to turn on lights within a building by use of a spotlight without entering the building. Thus, a beam of light transmitted through any light transmissive material may be utilized to control an electrically controlled device that may be inaccessible for manual control.

These together with other objects and advantages which will become subsequently apparent reside in the details of construction and operation as more fully hereinafter described and claimed, reference being had to the accompanying drawings forming a part hereof, wherein like numerals refer to like parts throughout.

Figures 1, 2:
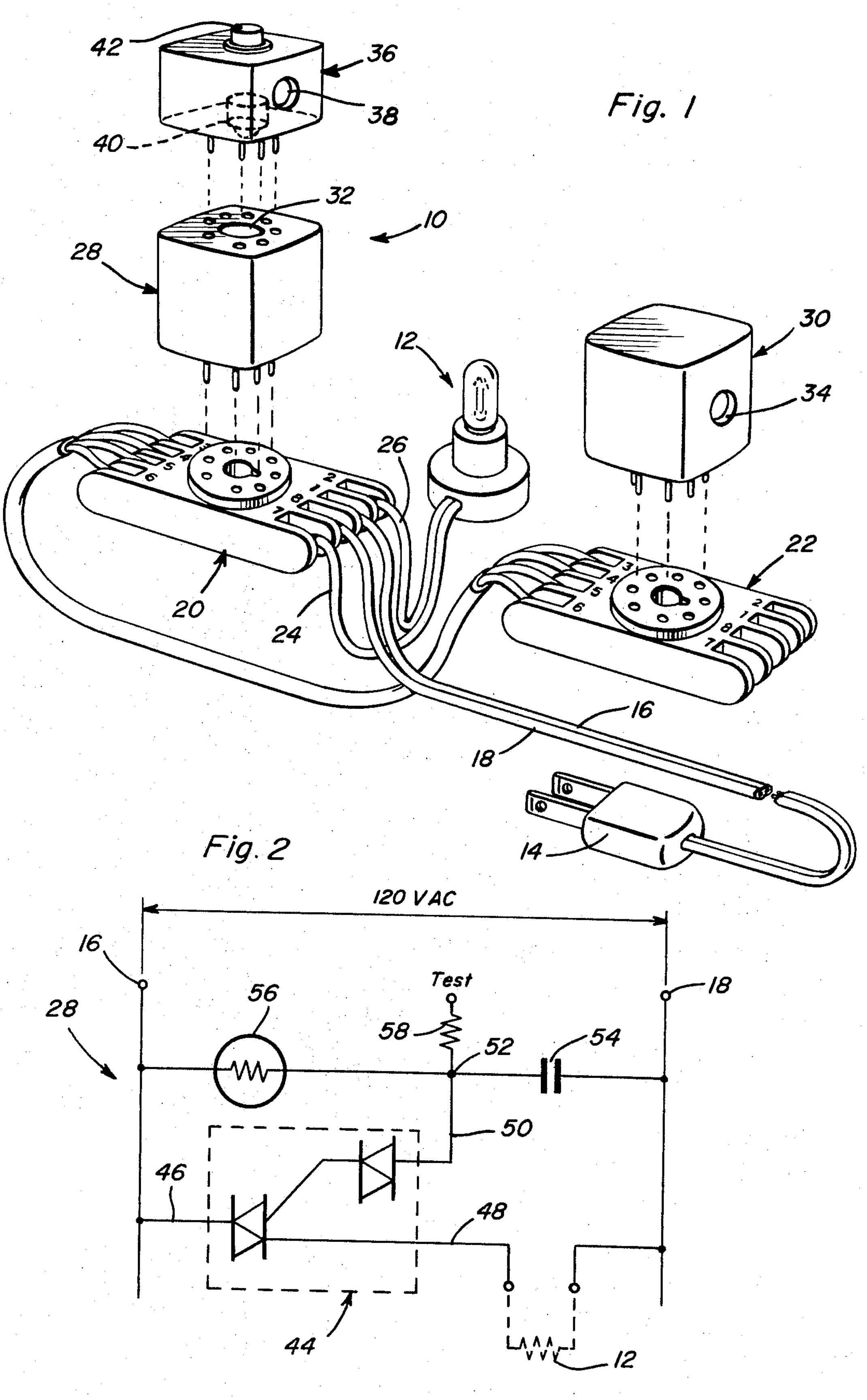
FIG. 1 is a perspective view showing a typical installational assembly embodying the control system of the present invention.
FIG. 2 is an electrical circuit diagram illustrating a switch module component associated with the control system of the present invention.

Referring now to the drawings in detail, FIG. 1 illustrates a typical light responsive control system generally referred to by reference numeral 10 which includes an electrically controlled device 12 such as a lamp adapted to be energized from a commercially available source of electrical energy to which the control system is connected by a typical plug 14 and current carrying conductors 16 and 18. The conductors 16 and 18 are connected to a pair of terminals in a typical octal tube socket 20 which is electrically interconnected with a second tube socket 22. Conductors 24 and 26 connected to two terminals of the tube socket 20, conduct current through the electrically controlled device 12.

A pair of switch modules 28 and 30 are adapted to be plugged into the tube sockets 20 and 22 respectively. The switch module 28 is provided with an opening 32 through which light is adapted to be internally received for actuating the switch module in order to close an energizing circuit for the electrically controlled device 12. Similarly, the switch module 30 is provided with an opening 34 by means of which externally generated light is adapted to actuate the switch module and turn off or open the energizing circuit for the electrically controlled device 12. The control system may be completed by a circuit holding module 36 adapted to be plugged into the module 28 on which it is stacked. The circuit holding module 36 is also activated by externally generated light entering through opening 38. The module 36 also is provided with a neon lamp 40 for generating light in order to maintain the switch module 28 closed because of the proximity of the lamp 40 to the opening 32. As will be explained hereafter in detail, externally generated light will actuate the switch module 28 to turn on the lamp 12 and the lamp 12 will remain energized even after the externally generated light is extinguished by virtue of the circuit holding module 36 which may be reset to permit de-energization of the lamp 12 upon actuation of the other switch module 30. Alternatively, the circuit holding module 36 may be manually reset by actuation of a manual reset switch 42 mounted thereon.

Referring now to FIG. 2, the switch module 28 is connected to the source of alternating current through the conductors 16 and 18 in order to apply an ac voltage across the electrically controlled device 12 in series with a static, electronic switch such as the quadrac 44. A conductor 46 connects one terminal of the quadrac to the power conductor 16 so that when it is rendered conductive, an energizing circuit is completed through conductor 48 to the electrically controlled device connected to the other power conductor 18. The quadrac is switched on when a predetermined voltage is supplied thereto through the control conductor 50 which is connected to a juncture 52 between a storage capacitor 54 and a photo-sensor in the form of a photo-resistive cell 56. The photo-resistive cell 56 and storage capacitor 54 are connected in series across the power voltage lines 16 and 18.

In the absence of light, the photo-resistive cell 56 has a normally high resistance so as to prevent any substantial charging of the storage capacitor 54. This resistance is substantially reduced when light impinges on the photo-resistive cell thereby permitting the charging of capacitor 54. When a predetermined voltage is established across the capacitor 54, and thereby between conductors 48 and 50, the quadrac 44 is switched on in order to complete an energizing circuit through the electrically controlled device 12. This circuit will be opened however as soon as the resistance of the photo-cell 56 rises upon removal of the externally generated light. The quadrac 44 may be tested and switched on and off manually by supply of the proper trigger voltage thereto through resistor 58 connected to one of the available terminals on the tube socket 20. Thus, the switch module 28 may be readily tested or alternatively controlled manually if desired.

Figure 3:
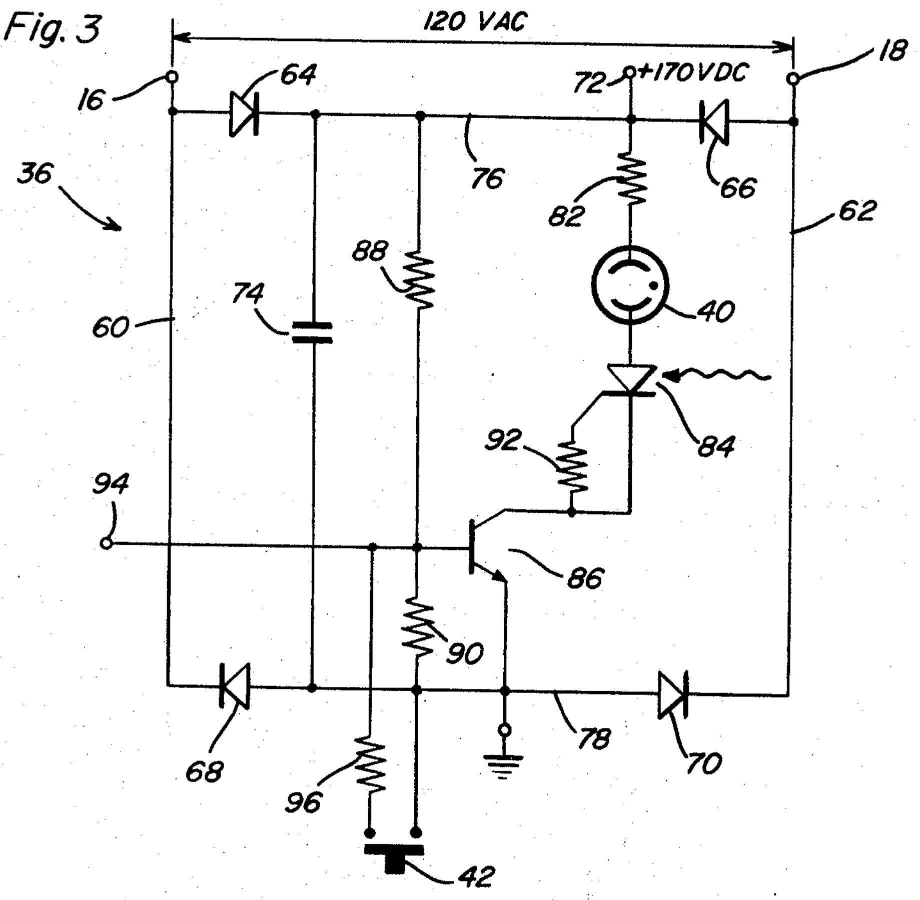
FIG. 3 is an electrical circuit diagram illustrating a circuit holding module component of the control system.

The circuit holding module 36 as shown in FIG. 3, is also connected to the alternating source of current by conductors 60 and 62 to which the voltage lines 16 and 18 are electrically connected. The diodes 64, 66, 68 and 70 are interconnected between the voltage lines 60 and 62 to form a rectifier bridge circuit providing a dc supply voltage at terminal 72. A filter capacitor 74 is connected between the rectified dc voltage line 76 and the negative reference voltage line 78 of the rectifier bridge circuit. Thus, a dc supply of voltage is provided for an illumination generating neon lamp 40 connected to the dc voltage line 76 through a current limiting resistor 82 and to one terminal of a light actuated, silicon controlled rectifier 84. The neon lamp 80 and SCR 84 are also connected in series across the dc voltage lines 76 and 78 with a dc switching transistor 86 that is normally maintained conductive by a base voltage controlled by the voltage dividing resistors 88 and 90. Thus, the neon lamp 80 is illuminated when light impinges on the light actuated silicon controlled rectifier 84. The SCR 84 is of the selflatching type in that once it is rendered conductive, it remains conductive in order to complete the energizing circuit through the lamp 80 and normally conductive transistor 86. Resistor 92 connected between the collector of transistor 86 and the control electrode of the SCR 84, determines the sensitivity of the SCR 84 to impinging light.

The energizing circuit for the neon lamp 80 is opened by a reset signal supplied to the base of transistor 86 through the signal terminal 94. Alternatively, the transistor 86 may be rendered non-conductive by closing of the manual reset switch which connects a reset resistor 96 across the resistor 90 to reduce the voltage thereacross to a level below that which is needed to maintain transistor 86 conducting.

Figure 4:
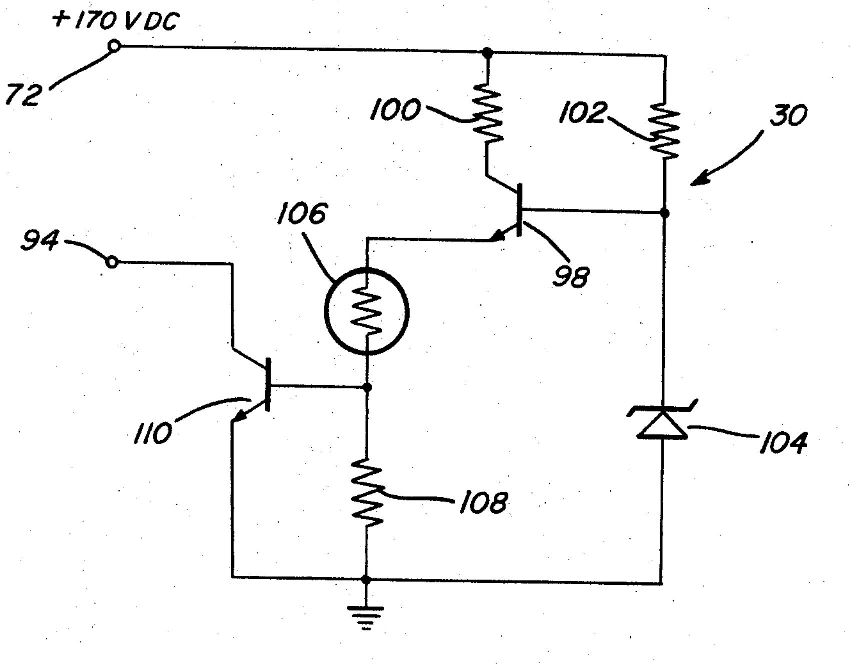
FIG. 4 is an electrical circuit diagram illustrating another switch module component of the control system.

The reset signal supplied to terminal 94 de-energizing the lamp 80 in the circuit holding module 36, is derived from the switch module 30 which is also actuated by externally generated light. The switch module 30 as shown in FIG. 4 is connected to the dc power supply of the module 36 through terminal 72 and includes a normally conductive transistor 98, resistors 100 and 102 and a zener diode 104 forming a voltage regulating circuit for supplying a constant voltage to one terminal of a photo-resistive cell 106. The photo-resistive cell 106 forms part of a voltage dividing network with resistor 108 connected to the base of a reset controlling transistor 110 which is normally maintained in a non-conductive state. Accordingly, when light impinges on the photo-resistive cell 106 to reduce its resistance, the transistor 110 is switched on in order to supply a reset signal to the terminal 94 in the circuit holding module 36 in order to cause unlatching of the SCR 84 and de-energization of the neon lamp 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A light responsive control system comprising a source of electrical energy, an electrically controlled device, terminal connecting means interconnecting the source and the device for supply of energizing current to the device, a pair of light actuated switch modules for respectively closing and opening an energizing circuit through said device, and circuit holding means for maintaining said energizing circuit closed upon actuation of one of the switch modules until reset by actuation of the other of the switch modules, said circuit holding means including rectifier means connected to said source for establishing a dc power supply, illumination generating means connected to said power supply for actuating one of the switch modules when energized, light activated, latching switch means connected to the illumination generating means for energizing the same and reset means connecting the latching switch means to the other of the switch modules for unlatching the switch means to deenergize the illumination generating means.

2. The combination of claim 1 wherein the circuit holding means is removably mounted on one of the switch modules.

3. The combination of claim 2 wherein the other of the switch modules includes a voltage controlled switch device connected to the reset means of the holding circuit means, photo-resistive means connected to the switch device for actuating the same, and voltage regulating means connected to the dc power supply in the holding circuit means for supply of a constant voltage to the photo-resistive means.

4. The combination of claim 3 wherein said one of the switch modules includes a quadrac connected in series with the controlled device to said source, storage capacitor means connected to the quadrac for switching the same on and off, and photo-sensing means connected between the source and the capacitor means for controlling the switching of the quadrac.

5. The combination of claim 4 wherein said terminal connecting means includes a pair of tube sockets respectively receiving the switch modules.

6. A light responsive control system comprising a source of electrical energy, an electrically controlled device, terminal connecting means interconnecting the source and the device for supply of energizing current to the device, a pair of light actuated switch modules for respectively closing and opening an energizing circuit through said device, and circuit holding means for maintaining said energizing circuit closed upon actuation of one of the switch modules until reset by actuation of the other of the switch modules, said terminal connecting means including a pair of tube sockets respectively receiving the switch modules.

7. The combination of claim 6 wherein the circuit holding means is removably mounted on one of the switch modules.

8. A light responsive control system comprising a source of electrical energy, an electrically controlled device, terminal connecting means interconnecting the source and the device for supply of energizing current to the device, a pair of light actuated switch modules for respectively closing and opening an energizing circuit through said device, and circuit holding means for maintaining said energizing circuit closed upon actuation of one of the switch modules until reset by actuation of the other of the switch modules, said one of the switch modules including a quadrac connected in series with the controlled device to said source, storage capacitor means connected to the quadrac for switching the same on and off, and photo-sensing means connected between the source and the capacitor means for controlling the switching of the quadrac.

9. The combination of claim 8 wherein said circuit holding means includes rectifier means connected to said source for establishing a dc power supply, illumination generating means connected to said power supply for actuating one of the switch modules when energized, light activated, latching switch means connected to the illumination generating means for energizing the same and reset means connecting the latching switch means to the other of the switch modules for unlatching the switch means to de-energize the illumination generating means.

10. The combination of claim 9 wherein the other of the switch modules includes a voltage controlled switch device connected to the reset means of the holding circuit means, photo-resistive means connected to the switch device for actuating the same, and voltage regulating means connected to the dc power supply in the holding circuit means for supply of a constant voltage to the photo-resistive means.

11. In a light control system, a source of electrical energy, an electrically controlled device, terminal connecting means interconnecting the source and the device for supply of energizing current to the device, a pair of light actuated switch modules for respectively closing and opening an energizing circuit through said device, one of said switch modules including a quadrac connected in series with the controlled device to said source storage capacitor means connected to the quadrac for switching the same on and off, and photo-sensing means connected between the source and the capacitor means for controlling the switching of the quadrac.

12. The combination of claim 11 wherein said terminal connecting means includes a pair of tube sockets respectively receiving the switch modules.

13. The combination of claim 11 including circuit holding means mounted by said one of the switch modules for illuminating the photo-sensing means until reset by actuation of the other of the switch modules.

14. The combination of claim 13 wherein the other of the switch modules includes a voltage controlled switch device, photo-resistive means connected to the switch device for actuating the same, and voltage regulating means for supply of a constant voltage to the photo-resistive means.

* * * * *